Figure 1:
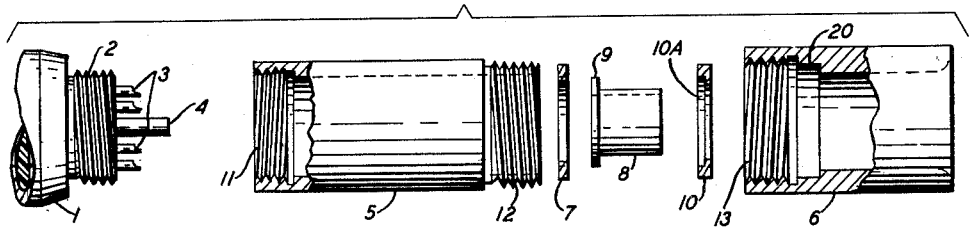

Dec. 31, 1963   C. C. BENTZ ETAL   3,116,361
CABLE CONNECTOR SHIELD
Filed Sept. 13, 1961

INVENTORS: C.C. BENTZ
P.J. TAMBURRO
BY Walter M. Hill
ATTORNEY

United States Patent Office 3,116,361
Patented Dec. 31, 1963

3,116,361
CABLE CONNECTOR SHIELD
Charles C. Bentz, Madison, and Peter J. Tamburro, Hanover Township, Morris County, N.J., assignors to Bell Telephone Laboratories, Incorporated, New York, N.Y., a corporation of New York
Filed Sept. 13, 1961, Ser. No. 138,547
7 Claims. (Cl. 174—88)

This invention relates to shielded cable connectors and more particularly to a cable connector suitable for use with multiconductor or coaxial cables at high frequencies.

A satisfactory cable connector must meet a number of rather specific requirements, among which are that the connector must be readily separated to disconnect the cable parts, it should provide adequate strain relief to prevent damage to the connections, it should provide polarization when used with a multiconductor cable, the connections should be made readily accessible for assembly and repair, and the connector should maintain the integrity of the shield at the point surrounding the connections, the shielding being at least as good or better than the cable shield itself. Not all of these requirements have been met by cable connectors of the prior art. In many cases the ground connection for the cable shield was made by forming a shield lead from strands of the braided cable shield or by otherwise securing a ground wire to the cable shield. Incomplete shielding always resulted. There has been a continuous need for a connector which will maintain complete shielding around the connections and at the same time provide ready accessibility to the connections for assembly and repair. The features of accessibility and complete shielding have appeared to be mutually inconsistent, particularly in the case of multiconductor cables. A typical solution of the prior art which provided good shielding necessitated passing the conductor ends through hollow connector pins and soldering them from the outside end. Should a repair be necessary, all of the connections have to be removed in order to disassemble the cable from the connector unit. The advantage of accessibility at the point where the conductors meet the connector pins is quite obvious. Also the advantage of having the connector shield electrically connected to the entire periphery of the cable shield is equally obvious as such a complete connection would be necessary in order to insure the shield integrity in the connector.

It is an object of this invention to terminate a shielded cable in a cable connector with complete accessibility to all connections while maintaining the shielding as good as or better than that of the cable itself.

The foregoing object is achieved by this invention by means of a cable connector shield comprising two tubular sections which are joined to form an integral tubular unit. A sleeve is electrically and mechanically secured to the cable shield and clamped between these two sections to form an electrically complete and mechanically secure shield and at the same time provide ready accessibility to the connections by merely separating the two sections and moving them up the cable. Movement of both sections up the cable is facilitated by the use of a C-shaped washer inserted adjacent one end of the sleeve.

Figure 2:
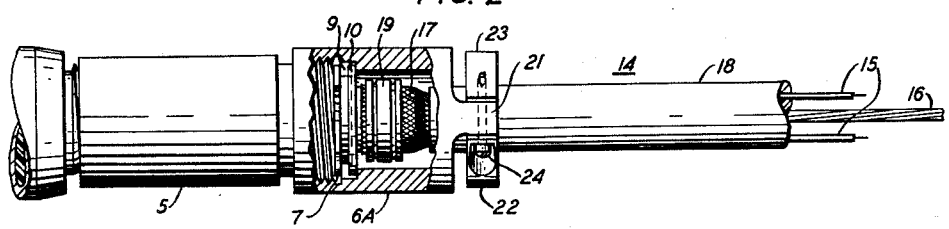
Figure 3:
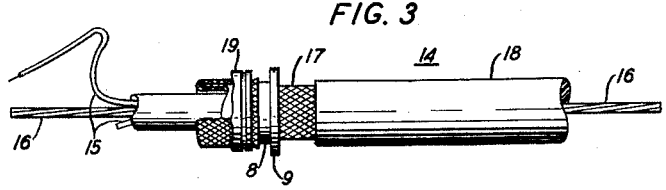
Figure 4:
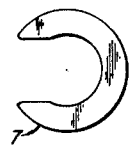
Figure 5:
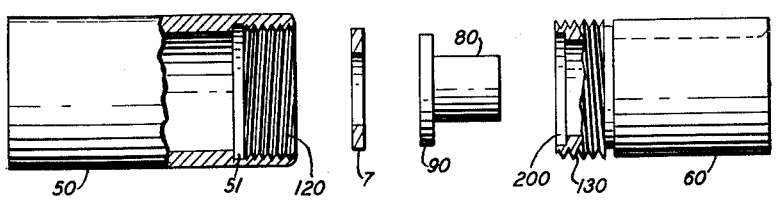

The invention may be better understood by reference to the accompanying drawings, in which:

FIG. 1 discloses an exploded view of an embodiment of the invention;

FIG. 2 discloses an assembly of the embodiment of FIG. 1 with a cable and an additional clamp to the outer jacket of the cable;

FIG. 3 discloses an alternative method of terminating the cable shield to the flanged sleeve of this invention;

FIG. 4 discloses the C-shaped washer used in securing the flanged shield between the two tubular sections; and FIG. 5 discloses the essential parts of an alternate form of the invention.

Referring now to FIG. 1, a multiple conductor connector 1 of conventional construction is shown in fragmentary view. It will be understood that connector 1 is only one part of a conventional two-part conductor structure and comprises a conductive shield housing enclosing a plurality of connector pins 3 and, occasionally, a strain relief termination 4, all supported within the housing by suitable insulating material. Integral with the shield housing of connector 1 is a threaded portion 2 for coupling to the cable connector shield comprising this invention. For many applications, the cable shield connector of this invention provides adequate strain relief without the need for the centrally located strain relief termination 4. However, in severe applications where great strains are to be applied to the cable, additional safety may be provided by constructing the cable with a central steel cable core which may be clamped into the hollow end of strain relief termination 4 by conventional means. The shield structure comprises the two tubular sections 5 and 6, the C-shaped washer 7 shown in cross section in this figure, a flanged sleeve 8 with flange 9 and a centering washer 10. Tubular section 5 has one threaded portion 11 which cooperates in assembly with the threaded portion 2, and a second threaded portion 12 which cooperates with the complementary threaded portion 13 on the other tubular section 6.

The method of assembling the cable in the cable connector may be observed by reference to FIGS. 2 and 3. In these figures the multiconductor shielded cable 14 is shown consisting of a plurality of conductors 15, a centrally located steel strain relief cable 16, a conductive braided cable shield 17 and an outer jacket insulating material 18. This cable construction will be recognized as of a conventional type. Before preparing the end of the cable for connection to the connector pins, the two tubular sections 5 and 6 and the centering washer 10 of FIG. 1 are passed over the end of the cable in the order shown in FIG. 1, tubular section 6 first being passed over the end of the cable, then washer 10, and finally tubular section 5. The end of the cable is then prepared by removing part of the outside jacket 18 and braided shield 17 in accordance with conventional practice. The end of the braided shield is then slid back slightly to cause the end to expand and separate from the rest of the cable. Ferrule 19 and sleeve 8 are then passed over the end of the cable in that order with the tubular portion of sleeve 8 passed between the insulated cable conductors and the braided shield 17. The ferrule 19 is then brought down over the braid so that the braid is between the inner surface of ferrule 19 and the outer surface of the tubular portion of sleeve 8. Ferrule 19 is then mechanically crimped to securely hold the braid to the sleeve 8 thereby forming both a mechanically and an electrically secure connection.

The strain relief cable 16 is then inserted into the centrally located termination 4 and secured therein by another crimping operation, also conventional. The bared ends of the conductors 15 are then inserted in the connector pins 3 and are secured therein, preferably by soldering. Tubular section 5 is then slid down over the sleeve 8 and attached to connector 1 by engaging threads 2 and 11 until they seat solidly. Tubular section 6 is then brought down over the sleeve 8 carrying with it the centering washer 10. At this point mention may be made of certain relative dimensions which must be observed in the design. The outside diameter of the crimped ferrule 19 must be smaller than the inside diameter of the centering washer 10 to permit this centering washer to pass over the ferrule and engage the flange 9, the outside diameter of which is slightly less than the recessed portion 10A of centering washer 10. It will also be observed that in order for tubular section 5 to pass over sleeve 8 its inside diameter must be slightly in excess of the outside diameter of flange 9. In order to prevent the left face of flange 9 from entering tubular section 5 when tubular section 6 is joined thereto by way of threads 12 and 13, the C-shaped washer 7 shown in FIG. 4 is passed over the cable between flange 9 and the right end of tubular section 5. The outside diameter of this washer is less than the root diameter of thread 12 while its inside diameter is less than the outside diameter of flange 9. The opening in this washer must be large enough to pass over the cable. It will now be apparent from these relative dimensions that the two tubular sections 5 and 6 may be secured together by their threads 12 and 13, respectively, thereby securely clamping the flange 9 between washers 7 and 10. As shown in FIG. 2, washer 10 fits into the recess 20 of tubular section 6, thereby centering the cable in the shield. It will also be observed that there is a continuous electrical connection around the entire periphery of the cable shield and the tubular section 6. The cable shield 17 is connected throughout its entire periphery around sleeve 8 which in turn is electrically connected throughout its entire periphery by flange 9 recessed in centering washer 10, the latter in turn being connected throughout its entire periphery against the seat in recess 20 of tubular section 6. This very efficiently maintains the integrity of the shield and it has been found that the shielding within this connector is as good as or better than the shielded cable itself.

Disassembly for repair is easily effected by simply unscrewing tubular section 6 from tubular section 5, removing the C-shaped washer 7 and finally separating tubular section 5 from connector 1 and sliding all of these parts up the cable. This completely exposes all of the connections of conductors 15 to connecting pins 3 without in any way injuring any of the connections.

In the embodiment shown in FIG. 1, tubular section 6 has no means for clamping it securely to the outer jacket of the cable. In some applications where the cable connector is to be handled frequently or the cable is to be kept in more or less constant motion, it is desirable that the cable be rigidly clamped to the connector so as to prevent the transmission of these mechanical motions to the mechanically weaker section in the vicinity of the crimping ring 19. By reason of the removal of the outer jacket 18 to lay bare the braided shield 17, this section will bend more easily than the original cable and this constant flexure can cause it to break. The embodiment shown in FIG. 2 employs conventional means for eliminating this difficulty. This means comprises a pair of clamps 22 and 23 secured to a pair of lugs 21 on tubular section 6A by means of a pair of machine screws 24. It will be understood that clamp members 22 and 23 are of such dimensions that, when drawn together by machine screws 24 their inner surfaces will securely clamp the outer surface of the jacketed cable.

FIG. 3 discloses an alternate method of securing sleeve 8 to the braided shield 17. In this case, sleeve 8 is turned end for end with respect to the manner in which it is shown in FIG. 2 and slid over the braided shield 17 rather than under it. The braided shield 17 is then folded back over the outside surface of sleeve 8 and ferrule 19 passed over this folded portion and securely crimped thereto. In order to facilitate the assembly of C-shaped washer 7, suitable space should be left between flange 9 and the end of the braided shield. Such a space is illustrated in FIG. 3. Assembly between the tubular sections is otherwise the same as previously described.

An alternative arrangement is shown in FIG. 5 where the inside and outside threads joining the two tubular shield sections have been interchanged, making it possible to use a larger inside diameter on the section which is attached to the connector 1. In this figure, sleeve section 50 corresponds in function and position with sleeve section 5 in FIGS. 1 and 2 while sleeve section 60 corresponds with shield section 6 of FIG. 1. In this case, no centering washer 10 is necessary as flange 90 is made larger in outside diameter to equal substantially the outside diameter of centering washer 10. The outside diameter of flange 90 is slightly less than the recessed portion 200 in tubular section 60 and the inside diameter of tubular section 50 is large enough to pass over flange 90. C-shaped washer 7, however, will bear against the shelf 51 to prevent this sleeve from passing into tubular section 50 when sections 50 and 60 are secured together. The structure is otherwise the same as shown in FIG. 1 and the assembly procedure is the same except that centering washer 10 is not used.

From the foregoing description, it will be observed that a unique structure has been disclosed making it possible to maintain the integrity of the shield and at the same time provide complete accessibility to the cable connections. This is made possible by making the tubular shield in two parts so that a flanged sleeve, electrically and mechanically secured to the braided shield, may be clamped therebetween. Moreover, it will be quite evident that essentially the same construction may be used with other types of shielded cable with different kinds of shielding construction as well as with coaxial cable. In this latter case, the plurality of connector pins 3 are not used and a single pin, which replaces the strain relief termination 4, is attached to the central conductor of the coaxial cable.

While two embodiments of the invention have been disclosed to illustrate its principles, it will be quite evident that various modifications thereof may be made by those skilled in this art without departing from the scope of the invention.

What is claimed is:

1. A shield for a shielded cable connector having a conductive housing, said shield comprising first and second conductive tubular sections, means for joining one end of said first section to the conductive housing, a coupling means for separably joining the other end of said first section to one end of said second section to form an integral tubular unit, a conductive tubular sleeve having a flange on one of its ends, said sleeve being adapted to be placed inside said unit and positioned concentrically to and near the end of the shield of a cable to be joined to said connector, the outside diameter of the flange on said sleeve being less than the minimum inside diameter of said first tubular section, means for electrically connecting the cable shield to said sleeve around its entire circumference, and means comprising a C-shaped washer inserted between said first section and the flange of said sleeve and an annular portion inside the second of said tubular sections for electrically and mechanically securing the flange between said two tubular sections.

2. A shield for a shielded cable connector having a conductive housing, said shield comprising first and second conductive tubular sections, means for joining one end of said first section to the conductive housing, a coupling means for separably joining the other end of said first section to one end of said second section to form an integral tubular unit, a conductive tubular sleeve having a flange, said sleeve to be positioned inside said tubular sections, the outside diameter of the flange on said sleeve being less than the minimum inside diameter of said first tubular section, means for electrically connecting the cable shield to said sleeve around its entire circumference, and means for securely clamping said flange between said two tubular sections and in electrical connection therewith throughout the entire circumference of said flange.

3. A shield for a shielded cable connector having a conductive housing, said shield comprising first and second conductive tubular sections, means for joining one end of said first section to the conductive housing, a conductive tubular sleeve having a flange, with an outside diameter less than the minimum inside diameter of said first tubular section, said sleeve to be positioned inside said tubular sections, means for separably joining the other end of said first section to one end of said second section to form a single elongated tubular unit, said means also securely clamping said flange between said sections to establish electrical contact between the entire periphery of said flange and at least one of said sections, and means for electrically connecting the cable shield to said sleeve around its entire circumference.

4. A shield for a shielded cable connector having a conductive housing, said shield comprising first and second conductive tubular sections, an inside thread on an end of one of said sections and a complementary outside thread on an end of the other section, a conductive tubular sleeve having a flange, with an outside diameter less than the minimum inside diameter of said first tubular section, said sleeve to be positioned inside said tubular sections, means for electrically connecting the cable shield to said sleeve around its entire circumference, a C-shaped washer inserted between said first section and the flange of said sleeve, said washer and said flange being so dimensioned that they may be clamped between and in an electrical contact with the threaded ends of said tubular sections as said threads are run together, and means on the other end of the first of said tubular sections for securing said section to the conductive housing.

5. A shield for a shielded cable connector having a conductive housing, said shield comprising two conductive tubular sections, the first of said sections having a thread at one of its ends, the second section having at one end a thread complementary to the thread on said first section and at the other end a means for electrically and mechanically securing it to said conductive housing, a conductive tubular sleeve having a flange with an outside diameter less than the minimum inside diameter of said second section, said sleeve to be positioned inside said tubular sections, means for electrically connecting the cable shield to said sleeve around its entire circumference and means for clamping said flange between and in electrical contact with said tubular sections as their complementary threads are run together.

6. A combination of claim 5 wherein said last named means includes a C-shaped washer inserted between said second section and said flange.

7. The combination of claim 5 wherein said last named means includes a pair of washers one of which is C-shaped and inserted between said second section and said flange.

References Cited in the file of this patent
UNITED STATES PATENTS

| | | |
|---|---|---|
| 2,858,358 | Hawke | Oct. 28, 1958 |
| 3,037,069 | Wilson | May 29, 1962 |

FOREIGN PATENTS

| | | |
|---|---|---|
| 811,589 | Great Britain | Apr. 8, 1959 |